United States Patent Office

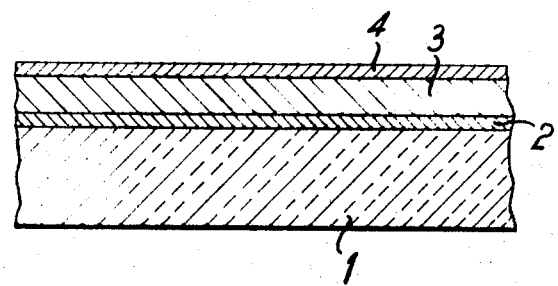
INVENTORS:
Karin WOLFF
Hansjoachim HAMISCH
BY
their ATTORNEY

3,560,994
Patented Feb. 2, 1971

3,560,994
VAPORIZABLE RECORDING MEDIUM
Karin Wolff and Hansjoachim Hamisch, Berlin, Germany, assignors to Robert Bosch G.m.b.H., Stuttgart, Germany
Filed Feb. 4, 1969, Ser. No. 796,531
Claims priority, application Germany, Feb. 6, 1968,
P 15 74 687.9
Int. Cl. G01d $15/34$
U.S. Cl. 346—135  8 Claims

ABSTRACT OF THE DISCLOSURE

Vaporization of selected portions of a thin film of bismuth by exposure to a focused laser beam is used to record information. The bismuth film, carried on an appropriate substrate, is sandwiched between a supporting layer of an easily vaporizable substance, and a superposed layer of a substance which decreases the reflectivity of the bismuth film.

BACKGROUND OF THE INVENTION

It is well known that a continuous wave beam of coherent light can be used to record information on a recording medium by vaporizing limited portions of an opaque coating deposited on a transparent carrier or sheet-like support.

At present the source of coherent high-intensity light is generally a laser. A relatively large number of substances are available as coatings when the primary specifications for their applicability are opaqueness and vaporizability. However, in view of the fact that the energy output of a laser must be of very high order to permit a fast scanning speed, and that focusing on a very small spot is desired, a number of such substances are unusable as coatings because their heat of vaporization or their reflectivity are too high.

As pointed out in U.S. Pat. No. 3,314,073, thin metal films are not considered suitable for coatings since they reflect most of the light impinging on them, even though their transmissivity is very low. According to the above-mentioned disclosure, blackened photographic films or india ink are considered to be suitable coating materials.

SUMMARY OF THE INVENTION

It has now been found experimentally that, in contrast to the previously held opinion, very satisfactory traces can be produced on metal coatings, so that even with a laser beam of relatively low energy a very high scanning speed is possible.

According to the presently preferred embodiment of the invention, an optically opaque coating of bismuth is deposited on an appropriate substrate. Bismuth has a reflectivity coefficient of 67% which is substantially lower than the 80–90% reflectivity coefficient of other metals. It has a low melting point (271° C.) and a low heat of vaporization (42.8 kcal./mole), implying a low energy requirement for vaporizing the substance. The low heat conductivity (0.02 cal./cm.) (C.°), and its low specific heat of 0.0295 cal./gm.) (C.°) reduce the loss of energy by heat conduction and insure a satisfactory utilization of the impinging laser energy.

All these factors contribute to the achievement of high quality and uniform traces in the bismuth film.

To improve the properties of the recording medium it is advantageous to add to a bismuth layer a superposed coating which further decreases the reflectivity.

The extent to which the reflection of a metallic layer is reduced by superposition of a dielectric coating depends on a certain ratio between the indices of refraction of the juxtaposed materials. (cf. H. Wolter, "Optik duenner Schichten," Handbuch der Physik, Bd. XXIV, 461, Springer-Verlag, 1956). For bismuth, which has the following components of the complex index of refraction, $$k_0 = 3.93 \text{ and } n_0 = 2.07$$

the best results are achieved by superposition of a material whose index of refraction is in the neighborhood of $n \approx 4$ that is, in particular, of silicon ($n = 4.5$) or germanium ($n = 4.4$). For coherent light produced by a laser, which has a wavelength corresponding to visible red light, germanium is well suited as a reflection reducing medium, and consequently, in accordance with a presently preferred embodiment of the invention, a germanium layer having a thickness of about 120 A. is superposed on the bismuth film.

Still another improvement in the recording speed and in the quality of the traces can be obtained by insertion of a layer of easily vaporizable material such as, for example, selenium, tellurium or cadmium, between the carrier and the bismuth coating deposited thereon. These elements have in common a low boiling point which contributes to the vaporization of the overlying bismuth.

Together with a layer of vaporizable material or as an alternative thereto, a combination of two components of organic or inorganic substances may be interposed between the carrier and a coating of selenium or the like. Under the impact of the laser beam the combination undergoes a chemical reaction, and a gaseous component is separated out. It is, of course, also possible to use, between the carrier and the adjacent selenium coating, a thin film consisting entirely or in part of an organic or inorganic compound such as, for example, an acid compound or a highly nitrified cellulose lacquer, which dissociates when energy is supplied and releases a gaseous compound.

Like selenium and other easily vaporizable materials mentioned above, such gaseous compounds aid in the vaporization of the bismuth layer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single figure is a fragmentary cross-sectional view of the recording medium according to the presently preferred embodiment of the invention.

DESCRIPTION OF THE PREFERRED EMBODIMENTS

In the drawing, the numeral 1 denotes a transparent sheetlike carrier made, for example, of synthetic plastic material. A selenium layer 2, approximately 50 A. thick, is superposed on the carrier 1, and a bismuth layer 3 of a thickness of 400 A. is disposed on top of layer 2. A germanium layer 4 of a thickness of 120 A. rests on top of the bismuth layer 3. The layers 2, 3 and 4 can be easily vaporized one after the other on the moving carrier 1.

The term "vaporization" used in connection with the present invention and in the claims submitted therewith, is intended to designate the action of the focused laser beam in removing portions of the coating 3 from the carrier 1; however, it is envisioned that under certain circumstances with certain coatings a fusion or a chemical reaction might take place in the presence of the laser beam to produce a transparent portion of the coating 3 or removal of material in the area on which the laser beam is focused, without creating a vapor. The term "Vaporization" is therefore to be understood to define any process whereby the area on which the laser beam is focused is caused to change from having an opaque or only slightly transmissive characteristic to having a much higher light transmission characteristic.

It will be understood that each of the elements described above, or two or more together, may also find a useful application in other types of recording media to record information by vaporization of limited portions thereof differing from the types described.

What is claimed as new and desired to be protected by Letters Patent is set forth in the appended claims.

What is claimed is:

1. For use in a system for recording information by exposure of a thermally vaporizable substance to modulated high-intensity light, particularly to a laser beam, a recording medium comprising a sheetlike support and an opaque bismuth coating applied to one side of said support; and a reflectivity-decreasing germanium coating superposed on said bismuth coating.

2. A recording medium according to claim 1 wherein said germanium coating has a thickness of approximately 120 A.

3. A recording medium as defined in claim 1, comprising an easily vaporizable coating under said bismuth coating.

4. A recording medium as defined in claim 3, wherein said easily vaporizable coating is selenium.

5. A recording medium as defined in claim 3, wherein said easily vaporizable coating comprises two components of an organic substance, adapted to undergo a chemical reaction by exposure to said laser beam and to release a gaseous component.

6. A recording medium as defined in claim 3, wherein said easily vaporizable coating comprises two components of an inorganic substance, adapted to undergo a chemical reaction by exposure to said laser beam and to release a gaseous component.

7. A recording medium as defined in claim 3, wherein said easily vaporizable coating comprises an organic compound adapted to dissociate by exposure to said laser beam and to release a gaseous compound.

8. A recording medium as defined in claim 3, wherein said easily vaporizable coating comprises an inorganic compound adapted to dissociate by exposure to said laser beam and to release a gaseous compound.

References Cited

UNITED STATES PATENTS

| | | | |
|---|---|---|---|
| 3,181,170 | 4/1965 | Akin | 346—108 |
| 3,314,073 | 4/1967 | Becker | 346—76 |
| 3,465,352 | 9/1969 | Carlson et al. | 346—76 |
| 3,474,457 | 10/1969 | Becker | 346—76 |

JOSEPH W. HARTARY, Primary Examiner

U.S. Cl. X.R.

117—8; 346—76